United States Patent
Saltzman et al.

(10) Patent No.: US 9,838,412 B2
(45) Date of Patent: Dec. 5, 2017

(54) COMPUTER SOFTWARE APPLICATION SELF-TESTING

(71) Applicant: International Business Machines Corporation, Armonk, NY (US)

(72) Inventors: Roi Saltzman, Rishon le Zion (IL); Ory Segal, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/928,714

(22) Filed: Oct. 30, 2015

(65) Prior Publication Data

US 2016/0055073 A1 Feb. 25, 2016

Related U.S. Application Data

(63) Continuation of application No. 13/602,559, filed on Sep. 4, 2012, now Pat. No. 9,256,511.

(51) Int. Cl.
*G06F 9/44* (2006.01)
*G06F 11/00* (2006.01)
(Continued)

(52) U.S. Cl.
CPC ........ *H04L 63/1433* (2013.01); *G06F 11/368* (2013.01); *G06F 11/3612* (2013.01); *G06F 11/3684* (2013.01); *G06F 21/52* (2013.01); *G06F 21/577* (2013.01); *H04L 63/14* (2013.01); *G06F 11/36* (2013.01); *G06F 11/3636* (2013.01)

(58) Field of Classification Search
None
See application file for complete search history.

(56) References Cited

U.S. PATENT DOCUMENTS

| 7,975,296 B2 | 7/2011 | Apfelbaum et al. |
| 9,015,668 B1 * | 4/2015 | Michelsen ................ G06F 8/70 717/120 |

(Continued)

FOREIGN PATENT DOCUMENTS

| CN | 102222192 A | 10/2011 |
| CN | 102262555 A | 11/2011 |
| WO | 200608159 A1 | 8/2006 |

OTHER PUBLICATIONS

"Crawling and Testing Dynamic Web Applications", [online] IPCom, Disclosure No. IPCOM000209833D, Aug. 17, 2011 [retrieved Sep. 3, 2012], 1 pg.

(Continued)

*Primary Examiner* — Lewis A Bullock, Jr.
*Assistant Examiner* — Mark Gooray
(74) *Attorney, Agent, or Firm* — Cuenot, Forsythe & Kim, LLC

(57) ABSTRACT

Testing a computer software application by detecting an arrival of input data provided as input to a computer software application from a source external to the computer software application, modifying the detected input data to include test data configured to test the computer software application in accordance with a predefined test, thereby creating a modified version of the detected input data, and processing the modified version of the detected input data, thereby performing the predefined test on the computer software application using the test data.

20 Claims, 4 Drawing Sheets

(51) Int. Cl.

| | |
|---|---|
| *G06F 12/14* | (2006.01) |
| *G06F 12/16* | (2006.01) |
| *G08B 23/00* | (2006.01) |
| *H04L 29/06* | (2006.01) |
| *G06F 21/57* | (2013.01) |
| *G06F 21/52* | (2013.01) |
| *G06F 11/36* | (2006.01) |

(56) References Cited

U.S. PATENT DOCUMENTS

| | | |
|---|---|---|
| 2004/0093588 A1 | 5/2004 | Gschwind et al. |
| 2005/0251863 A1 | 11/2005 | Caleb |
| 2008/0282352 A1* | 11/2008 | Beddoe ............... H04L 63/1433 726/25 |
| 2009/0083854 A1* | 3/2009 | Bozanich ............ H04L 63/1433 726/23 |
| 2010/0169974 A1 | 7/2010 | Calendino et al. |
| 2011/0161486 A1 | 6/2011 | Podjarny et al. |
| 2012/0167219 A1 | 6/2012 | Zaitsev et al. |
| 2014/0068563 A1 | 3/2014 | Saltzman et al. |

OTHER PUBLICATIONS

Fong, E. et al., "Web Application Scanners: Definitions and Functions", IEEE 40th Annual Hawaii Int'l Conf. on Source: System Sciences, HICSS 2007, Jan. 2007, 7 pgs.

U.S. Appl. No. 13/602,559, Non-Final Office Action, dated Aug. 14, 2014, 14 pg.

U.S. Appl. No. 13/602,559, Final Office Action, dated Dec. 19, 2014, 18 pg.

U.S. Appl. No. 13/602,559, Notice of Allowance, dated Oct. 14, 2015, 9 pg.

\* cited by examiner

GET /eshop/buyProduct.jsp?productID=1&price=15.00

Fig. 2A

GET /eshop/buyProduct.jsp?productID={TEST_PAYLOAD1}&price=15.00
GET /eshop/buyProduct.jsp?productID={TEST_PAYLOAD2}&price=15.00
GET /eshop/buyProduct.jsp?productID={TEST_PAYLOAD3}&price=15.00
GET /eshop/buyProduct.jsp?productID={TEST_PAYLOAD4}&price=15.00

Fig. 2B

US 9,838,412 B2

COMPUTER SOFTWARE APPLICATION SELF-TESTING

FIELD OF THE INVENTION

The invention relates to computer software testing in general.

BACKGROUND OF THE INVENTION

Dynamic analysis tools are often used by computer software developers to test computer software applications, typically by first exploring an application to discover its interfaces, including those by which data may be provided to the application, and then by interacting with the application's interfaces and monitoring the application's responses to such interactions. In one type of dynamic analysis an application is tested for security vulnerabilities by providing data with known malicious properties to the application. For example, dynamic analysis may be used to test a web application that is accessed over a computer network, such as the Internet, by employing a "black-box tester" running on one computer that sends HTTP requests via a network to the web application that is hosted by another computer. The HTTP requests are configured with malicious payloads designed to test for security vulnerabilities such as SQL injection, cross-site scripting, and command injection. Unfortunately, such testing often produces hundreds of thousands of requests and responses, resulting in a great deal of traffic between the black-box tester and the application being tested, which may negatively affect overall testing performance and duration.

SUMMARY OF THE INVENTION

In one aspect of the invention a method is provided for testing a computer software application, the method including detecting an arrival of input data provided as input to a computer software application from a source external to the computer software application, modifying the detected input data to include test data configured to test the computer software application in accordance with a predefined test, thereby creating a modified version of the detected input data, and processing the modified version of the detected input data, thereby performing the predefined test on the computer software application using the test data.

In another aspect of the invention a method is provided for testing a computer software application, the method including instrumenting a computer software application to detect an arrival of input data provided as input to a computer software application from a source external to the computer software application, modify the detected input data to include test data configured to test the computer software application in accordance with a predefined test, thereby creating a modified version of the detected input data, and process the modified version of the detected input data, thereby performing the predefined test on the computer software application using the test data, and analyzing results of the predefined test responsive to the computer software application performing the predefined test using the test data.

In other aspects of the invention systems and computer program products embodying the invention are provided.

BRIEF DESCRIPTION OF THE DRAWINGS

The invention will be understood and appreciated more fully from the following detailed description taken in conjunction with the appended drawings in which:

FIG. 2A is a simplified example of input data useful in understanding the system of FIG. 1;

FIG. 2B is a simplified example of modified input data useful in understanding the system of FIG. 1;

DETAILED DESCRIPTION OF THE INVENTION

Figure 1:
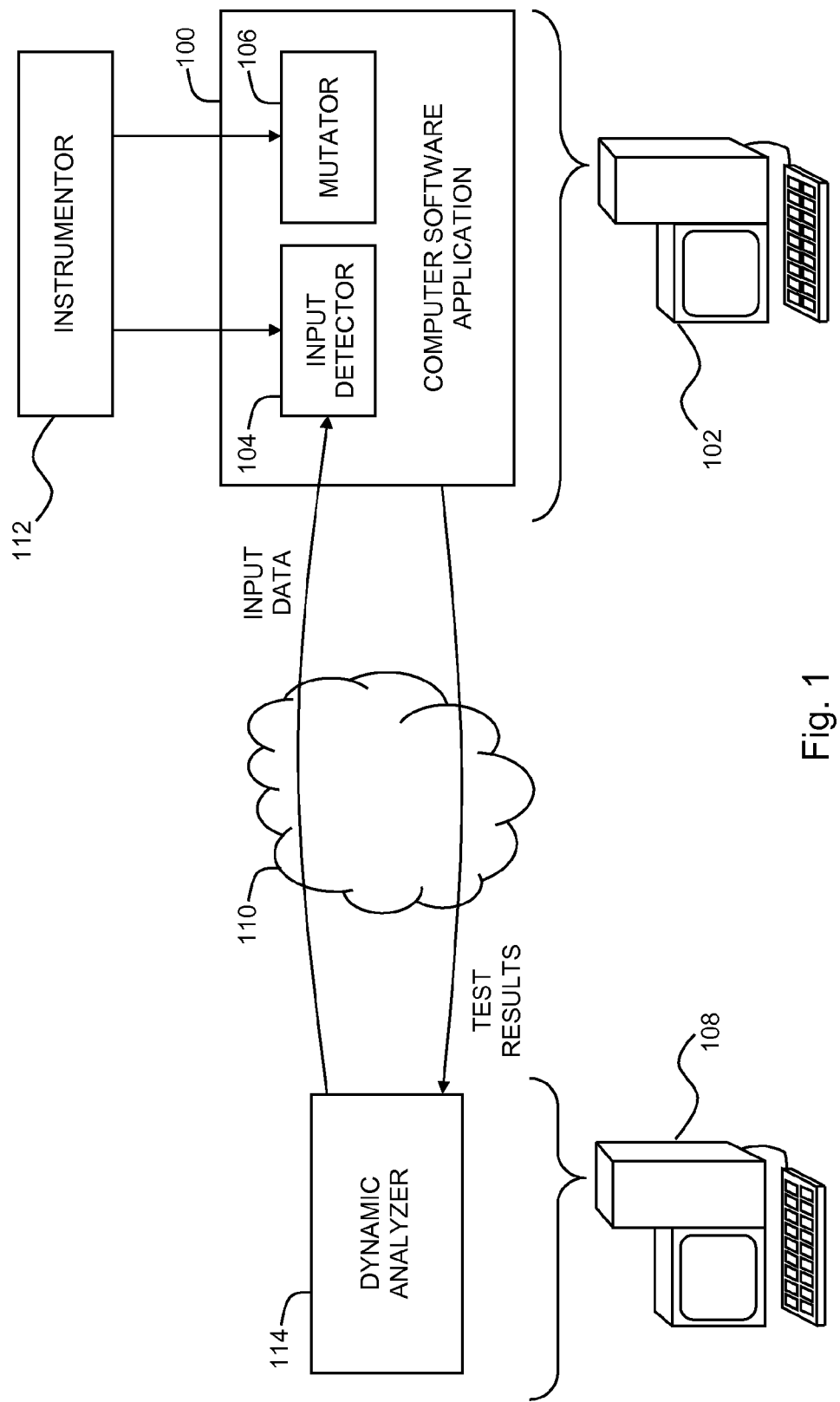
FIG. 1 is a simplified conceptual illustration of a system for testing a computer software application, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for testing a computer software application, constructed and operative in accordance with an embodiment of the invention. In the system of FIG. 1, a computer software application 100, such as may be hosted by a computer 102, is preferably instrumented to include an input detector 104 and a mutator 106. Computer software application 100 may, for example, be a "web" application including Hypertext Markup Language (HTML)-encoded web pages, with computer 102 acting as a web application server. Input detector 104 is preferably configured to detect the arrival of input data, such as in the form of Hypertext Transport Protocol (HTTP) requests, provided as input to computer software application 100 from a source external to computer software application 100, such as from a computer 108 that is configured to communicate with computer software application 100 at computer 102 via a computer network 110, such as the Internet. Mutator 106 is preferably configured to modify the detected input data to include test data configured to test computer software application 100 in accordance with a predefined test, thereby creating a modified version of the detected input data. The predefined test may, for example, be designed to test for a known type of security vulnerability, such as SQL injection, where the test data includes a malicious payload designed to exploit the security vulnerability. Mutator 106 then provides the modified version of the detected input data for processing by computer software application 100. Computer software application 100 processes the modified version of the detected input data, thereby performing the predefined test using the test data included in the modified version of the detected input data.

In accordance with an embodiment of the invention mutator 106 is configured to modify a given instance of detected input data multiple times to create multiple modified versions of the detected input data, where each version includes different test data. For example, FIG. 2A shows detected input data in the form of an HTTP request, from which four modified versions of the detected input data are created as shown in FIG. 2B, where each version of the detected input data is modified to include different test data as represented by TEST_PAYLOAD1, TEST_PAYLOAD2, TEST_PAYLOAD3, and TEST_PAYLOAD4. Mutator 106 may be configured to create any number of modified versions of a given instance of detected input data for a given predefined test, and may do so for any number of different predefined tests. Mutator 106 then provides each of the modified versions of the detected input data for processing by computer software application 100.

The system of FIG. 1 also preferably includes an instrumentor 112 configured to instrument computer software application 100 to include input detector 104 and mutator 106, such as between identified "sources" and "sinks," where sources are application programming interfaces (API) that introduce "untrusted" input, such as user input, into an application, and sinks are security-sensitive operations, such as where the application modifies a database.

The system of FIG. 1 also preferably includes a dynamic analyzer 114 configured to analyze results of predefined tests performed by computer software application 100 as described hereinabove. Dynamic analyzer 114 may, for example, be a "black-box" testing tool hosted by computer 108, where dynamic analyzer 114 is configured to "crawl" computer software application 100 to discover its application interfaces, send input data, such as the detected input data described hereinabove, to computer software application 100 via the discovered application interfaces, and analyze results of the predefined tests performed using the modified version(s) of the detected input data as described hereinabove. Dynamic analyzer 114 may additionally or alternatively be a "glass-box" testing tool hosted by computer 102 that monitors the operation of computer software application 100 to detect when a predefined test is performed. Dynamic analyzer 114 preferably reports the results of its analysis using conventional techniques.

Any of the elements shown in FIG. 1 are preferably implemented by one or more computers, such as computers 102 and 108, in computer hardware and/or in computer software embodied in a non-transitory, computer-readable medium in accordance with conventional techniques.

Figure 3:
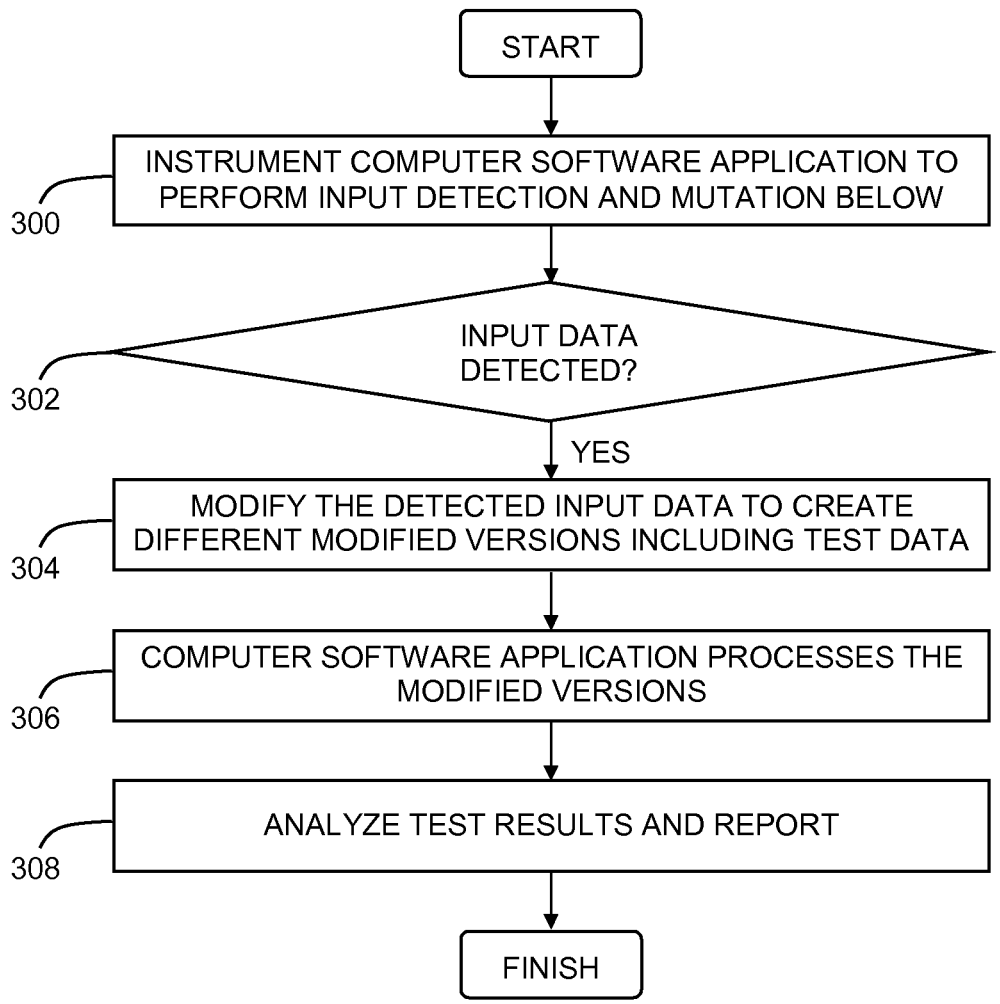
FIG. 3 is a simplified flowchart illustration of an exemplary method of operation of the system of FIG. 1, operative in accordance with an embodiment of the invention.

Reference is now made to FIG. 3, which is a simplified flowchart illustration of an exemplary method of operation of the system of FIG. 1, operative in accordance with an embodiment of the invention. In the method of FIG. 3 a computer software application is instrumented (step 300) to detect an arrival of input data provided as input to the computer software application from a source external to the computer software application (step 302), and modify the detected input data to create one or more modified versions of the detected input data in accordance with a predefined test, or for each of multiple different predefined tests, where each modified version includes different test data (step 304). The computer software application processes the modified version(s) of the detected input data, thereby performing the predefined test(s) on the computer software application using the test data (step 306). Results of the performed test(s) are analyzed, and the results of the analysis are reported (step 308).

Figure 4:
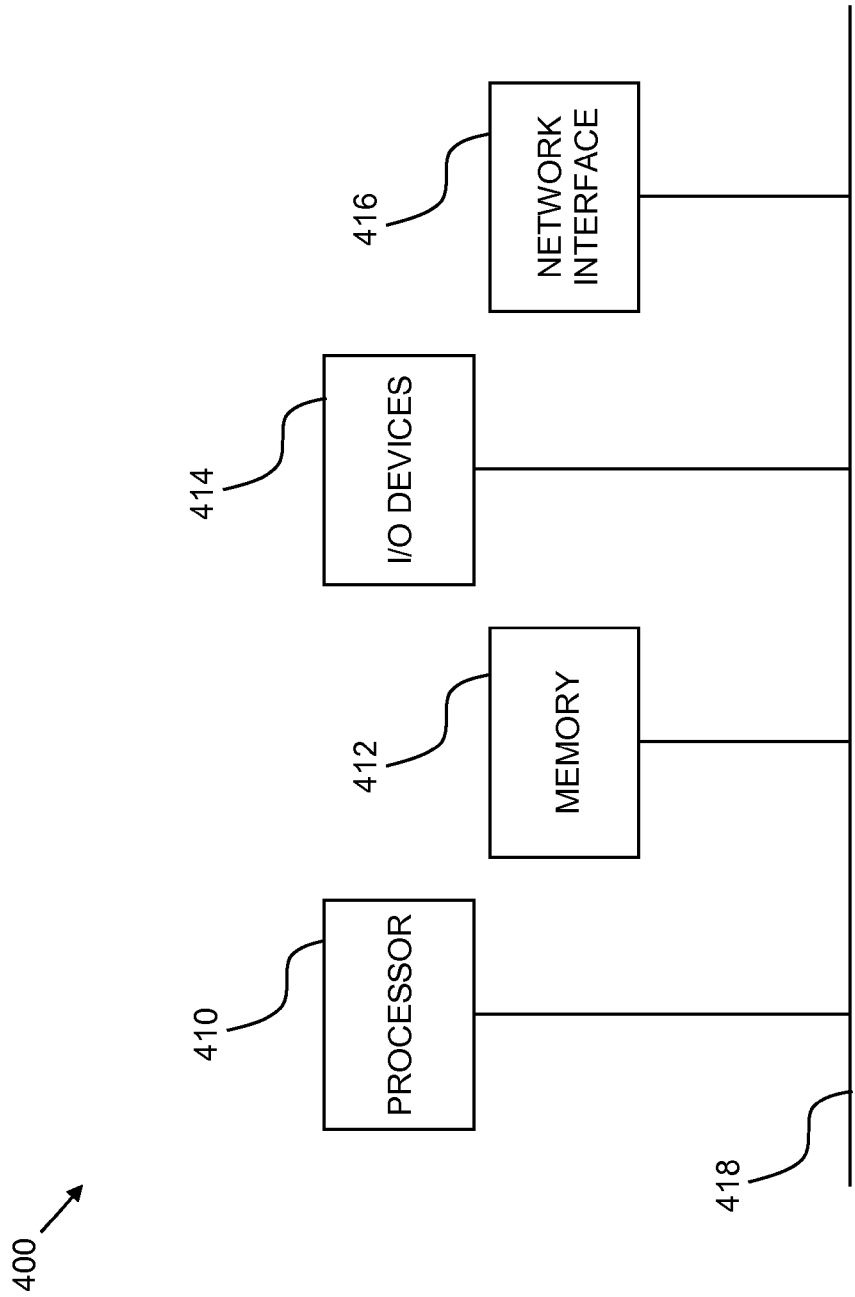
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer-implemented method for testing a computer software application, comprising:
    receiving, by the computer software application, input data from a source external to the computer software application;
    modifying, by the computer software application, the received input data to include test data to create a modified version of the received input data; and
    performing a predefined test on the computer software application using the test data, wherein
    the test data is configured to perform the predefined test.

2. The method of claim 1, wherein
    the computer software application is instructed to perform the modifying.

3. The method of claim 1, wherein
    the computer software application is a web application, and
    the received input data is an HTTP request.

4. The method of claim 1, wherein
    the predefined tests is configured to test for a known type of security vulnerability, and
    the test data includes a malicious payload configured to exploit the security vulnerability.

5. The method of claim 1, wherein
    the modifying creates a plurality of modified versions of the received input data using, respectively, using different test data.

6. The method of claim 1, wherein
    results of the predefined test are forwarded to the source.

7. The method of claim 6, wherein
    the source is a dynamic analyzer.

8. A computer hardware system configured to test a computer software application, comprising:
    at least one processor configured to initiate the following executable operations comprising:
        receiving, by the computer software application, input data from a source external to the computer software application;

modifying, by the computer software application, the received input data to include test data to create a modified version of the received input data; and performing a predefined test on the computer software application using the test data, wherein the test data is configured to perform the predefined test.

9. The system of claim 8, wherein
the computer software application is instructed to perform the modifying.

10. The system of claim 8, wherein
the computer software application is a web application, and
the received input data is an HTTP request.

11. The system of claim 8, wherein
the predefined tests is configured to test for a known type of security vulnerability, and
the test data includes a malicious payload configured to exploit the security vulnerability.

12. The system of claim 8, wherein
the modifying creates a plurality of modified versions of the received input data using, respectively, using different test data.

13. The system of claim 8, wherein
results of the predefined test are forwarded to the source.

14. The system of claim 13, wherein
the source is a dynamic analyzer.

15. A computer program product, comprising:
a computer-readable storage medium having stored therein computer-readable program code for testing a computer software application the computer-readable program code, when executed by a computer hardware system, causes the computer hardware system to perform:

receiving, by the computer software application, input data from a source external to the computer software application;

modifying, by the computer software application, the received input data to include test data to create a modified version of the received input data; and performing a predefined test on the computer software application using the test data, wherein the test data is configured to perform the predefined test.

16. The computer program product of claim 15, wherein
the computer software application is instructed to perform the modifying.

17. The computer program product of claim 15, wherein
the computer software application is a web application, and
the received input data is an HTTP request.

18. The computer program product of claim 15, wherein
the predefined tests is configured to test for a known type of security vulnerability, and
the test data includes a malicious payload configured to exploit the security vulnerability.

19. The computer program product of claim 15, wherein
the modifying creates a plurality of modified versions of the received input data using, respectively, using different test data.

20. The computer program product of claim 15, wherein
results of the predefined test are forwarded to the source.

* * * * *